(12) United States Patent
Wang et al.

(10) Patent No.: US 8,663,731 B2
(45) Date of Patent: Mar. 4, 2014

(54) DETACHABLE FRAMEWORK USED FOR WINDING OPTICAL FIBER COIL AND A METHOD OF PRODUCING OPTICAL FIBER COIL

(75) Inventors: Wei Wang, Beijing (CN); Jing Li, Beijing (CN); Qingsheng Yang, Beijing (CN); Xuefeng Wang, Beijing (CN); Jinquan Tan, Beijing (CN)

(73) Assignee: Beijing Aerospace Times Optical-Electronic Technology Co., Ltd., Beijing (CN)

( * ) Notice: Subject to any disclaimer, the term of this patent is extended or adjusted under 35 U.S.C. 154(b) by 927 days.

(21) Appl. No.: 12/747,636

(22) PCT Filed: Feb. 6, 2009

(86) PCT No.: PCT/CN2009/070368
§ 371 (c)(1),
(2), (4) Date: Jun. 11, 2010

(87) PCT Pub. No.: WO2010/057373
PCT Pub. Date: May 27, 2010

(65) Prior Publication Data
US 2010/0260930 A1 Oct. 14, 2010

(30) Foreign Application Priority Data

Nov. 19, 2008 (CN) .......................... 2008 1 0226867

(51) Int. Cl.
*G01C 19/72* (2006.01)
(52) U.S. Cl.
USPC ........ 427/163.2; 427/178; 427/240; 427/294; 427/379; 427/389.7
(58) Field of Classification Search
USPC ........... 427/163.2, 178, 294, 379, 389.7, 240; 356/465
See application file for complete search history.

(56) References Cited

U.S. PATENT DOCUMENTS

| 4,388,363 | A | * | 6/1983 | Fountain | 428/215 |
| 4,793,708 | A | * | 12/1988 | Bednarz | 356/465 |
| 5,371,593 | A | | 12/1994 | Cordova et al. | |
| 5,917,983 | A | * | 6/1999 | Page et al. | 385/134 |

FOREIGN PATENT DOCUMENTS

| CN | 1514205 A | 7/2004 |
| CN | 101275835 A | 10/2008 |
| CN | 101403616 A | 4/2009 |
| JP | 5215559 A | 8/1993 |
| JP | 8122529 A | 5/1996 |
| JP | 2002054931 A | 2/2002 |

* cited by examiner

Primary Examiner — Michael Cleveland
Assistant Examiner — Alex A Rolland
(74) Attorney, Agent, or Firm — Workman Nydegger

(57) ABSTRACT

A detachable framework used for winding optical fiber coils and a method of producing optical fiber coils with this framework. A framework with a suitable structure is designed considering comprehensively three factors, i.e., the window ratio of an optical fiber coil, the precision of an optical fiber gyro and the easy detachment of the framework from the optical fiber coil. A surface treatment with the framework is performed by coating a layer of thermosol on the surface of the framework so the optical fiber coil can be easily detached from the framework after curing. The required length of optical fiber is winded around the optical fiber coil framework, accompanying with vacuum pressure impregnating with curing adhesive after winding and optical fiber coil curing subsequently. The framework is taken off from the optical fiber coil under the heating circumstances, thereby completing production of the non-framework optical fiber coil.

12 Claims, 3 Drawing Sheets

2a

2b

3a

3b

6a

6b

DETACHABLE FRAMEWORK USED FOR WINDING OPTICAL FIBER COIL AND A METHOD OF PRODUCING OPTICAL FIBER COIL

FIELD OF THE INVENTION

This invention relates to a framework used for winding optical fiber coil and a method of producing optical fiber coil.

BACKGROUND OF THE INVENTION

In recent years, the domestic optical fiber gyro developed quickly. The engineering optical fiber gyro with medium and low precision was realized basically and was used successfully in many fields; the research and manufacture of the high-precision optical fiber gyro also went ahead like a raging fire. But generally speaking, there is a great gap between the domestic and foreign level. According to the basic working principle of optical fiber gyro:

$$\Delta \varphi_R = \frac{2\pi L D}{\lambda C} \Omega \qquad (1)$$

In which, $\Delta \phi_R$ is the phase difference between two beams of light which propagates in opposite directions in optical fiber coil, L is length of the optical fiber coil, D is the average diameter of the optical fiber coil, $\lambda$ is the wave length of light wave, C is the propagation speed of light wave in vacuum, $\Omega$ is the angle speed to which the optical fiber gyro is sensible. The phase difference $\Delta \phi_R$ between two beams of light which propagates in opposite directions in optical fiber coil is proportional to the product of the length of the optical fiber coil and the average diameter LD. So the high-precision optical fiber gyro not only enlarges the diameter of the framework of the optical fiber coil, but also uses a longer optical fiber to wind the optical fiber coil. While, nonreciprocal phase difference between the two beams of light that propagates in opposite directions in the optical fiber coil not caused by rotation is one of the main error sources of the optical fiber gyro. The longer the optical fiber is, the higher the probability of occurrence of this kind of nonreciprocal phase difference is. Furthermore, this kind of nonreciprocal phase difference can be caused under the temperature environment by many factors such as the heat expansion of the framework of the optical fiber coil and unevenness of the heat field, and this problem of nonreciprocal phase difference must be solved by improving techniques. In the high-precision optical fiber gyro, how to reduce the influence of the framework to the optical fiber coil in high and low temperature, how to make the optical fiber coil reach the heat balance quickly and how to reduce the influence of outer environment to the optical fiber coil are all very important. One of the main reasons why the high-precision optical fiber gyro in our country has not achieved breakthrough progress is that the technical problems in optical fiber coil have not been solved completely.

In order to solve the technical problems of the optical fiber coil used in the high-precision optical fiber gyro, the R&D companies mostly use quadrupole symmetry winding method to wind optical fiber coil, and then perform curing to the optical fiber coil. The purpose of performing curing to the optical fiber coil is to improve the vibration characteristics of the coil and the property of repetition of the multiple electrification of the optical fiber gyro. The purpose of quadrupole symmetry winding method is to cause the two pieces of optical fibers of the optical fiber coil which are symmetrical relative to the middle point to undergo the same temperature field, so as to reduce the nonreciprocal phase difference caused by temperature. The temperature field inside the optical fiber coil, which influences the physical parameters such as refractive index and line expansion coefficient of the optical fiber, is related to the space location and time of the optical fiber. We take the refractive index caused by temperature as an example:

Considering the optical fiber coil with length of L as shown in FIG. 1 which is the diagrammatic drawing of temperature or stress disturbance in the optical fiber coil, there is a temperature disturbance on the small piece of optical fiber $\delta z$ from which there is a distance of z to one of the ends of the optical fiber (M in this figure stands for the middle point of the length). Then the nonreciprocal phase difference introduced by this disturbance can be expressed as:

$$\delta \phi_T(z) = \frac{2\pi}{\lambda} \frac{dn}{dt}(z) \frac{n(L-2z)}{C} \delta z \qquad (2)$$

$$\frac{dn}{dt}(z) = \frac{dn}{dT} \cdot \frac{dT}{dt}(z) \qquad (3)$$

In this equation, $\lambda$ is the wave length of light wave, dσ/dT is the change rate of the refractive index of optical fiber to temperature, dT/dt is the time change rate of temperature at the place of $\delta z$, n is the refractive index of optical fiber, C is the light speed in vacuum. It can be seen from the equation (2) that the farther the micro-element disturbed by temperature is from the middle point of optical fiber, the larger the introduced nonreciprocal phase difference is. By integrating in the full-length range of the coil, the total phase difference introduced by temperature disturbance can be obtained:

$$\Delta \phi_T = \frac{2\pi n}{\lambda C} \cdot \frac{dn}{dT} \int_0^L \frac{dT}{dt}(z)(l-2z)dz \qquad (4)$$

If the two pieces of optical fibers that are symmetrical relative to the middle point of the coil undergo the same temperature change, the integral in the equation (4) is zero and the phase difference introduced by temperature disturbance is also zero. The principle of refractive index change caused by stress is the same as the principle of that caused by temperature. If the two pieces of optical fiber that are symmetrical relative to the middle point of the coil undergo the same stress change, the phase difference introduced by stress disturbance is also zero.

The main problem using the above solution is: in the practical situation, because of non-ideal winding (e.g., not complete symmetry of winding, optical fiber cross phenomenon of each layer in the optical fiber coil) and faultiness of curing technique (uneven thickness of the adhesive, long heat balance time of the optical fiber, non-linearity of the temperature grads and so on), the two pieces of optical fibers that are symmetrical relative to the middle point of the coil cannot undergo the complete same temperature field; because the impregnation of adhesive in curing technique makes the optical fiber in the optical fiber coil receive force unevenly and the thermal expansion and cold contraction of the framework apply stress on the optical fiber, and etc., the optical fiber coil also cannot undergo the complete same stress field; in the temperature and mechanics vibration environment, the optical fiber coil cannot satisfy the precision requirement of the high-precision optical fiber gyro yet, so the design and technique must be further improved based on the existing base to advance the performance of optical fiber coil, so as to improve the precision of optical fiber gyro.

At present, the abroad patents and articles about winding method of optical fiber coil all only described a quadrupole symmetry winding method, and did not disclose the methods of producing non-framework optical fiber coils.

Concerning reports about framework, in domestic patent with publication number CN 101275835A and invention title of "Des-backbone winding ring clamp for non-upper edge optic fiber ring of optic fiber gyro", the flanges on two sides of the framework are removed by means of clamp so that the upper part of optical fiber coil has no upper edge restriction and is in free state. But the implementation way by using clamp in that application is more complex, and the wheel hub and coil in framework are not separated, so the radial stress to the optical fiber coil produced by wheel hub can not be eliminated.

DISCLOSURE OF THE INVENTION

The purpose in this invention is to overcome the disadvantage of the prior art to provide a detachable framework used for winding optical fiber coil and a method of producing optical fiber coil with this framework to improve the temperature characteristics and the vibration characteristics of optical fiber coil.

The technical solution of this invention is as follows:

A detachable framework used for winding optical fiber coil, characterized in that it includes a wheel hub, which has a demountable structure to separate the wheel hub from the optical fiber coil winded on the wheel hub, and two flanges, which are installed on both ends of the wheel hub respectively and demountably.

The demountable structure is a convex platform made on at least one end face of the wheel hub and a hole matching with the convex platform set on the flanges, when the flanges and the wheel hub are separated, the wheel hub and the optical fiber coil can be separated by dragging the convex platform.

The wheel hub is spliced by at least two columns whose inside and outside cylinders are curved surfaces, the demountable structure is an axial through gap formed between at least one of the columns splicing places of the two facing cylinders and a filling component matching with the gap.

The demountable structure also includes a convex platform made on one of the ends of the wheel hub or an end of the filling component, holes or grooves matching with the convex platform are set on the flanges.

The method of producing optical fiber coil in this invention includes the following steps:

(1) coating a layer of thermosol on the surface of the framework;

(2) winding the coil, placing the winded optical fiber coil in the vacuum pressure device, and performing impregnation with curing adhesive under vacuum pressure;

(3) -performing curing of the optical fiber coil;

(4) heating the after-curing optical fiber coil and taking off the framework.

It also carries out the following step after the step (2):

(2)' placing the optical fiber coil that was already impregnated on the centrifugal machine to whirl coating.

It also carries out the following step after the step (4):

(4)' coating heat insulating adhesive both on the most inner layer and the most outer layer of the optical fiber coil.

After curing in the step (3), the stress releasing of the optical fiber coil is performed using small magnitude of vibration.

The magnitude of vibration is controlled in the range of 2~6 g and the time is controlled in the range of 30~60 minutes.

The thickness of the thermosol in the step (1) is 0.5~1 mm.

The process of winding coil in the step (2) is to determine the tension used when winding the first layer according to the number of layers of the optical fiber coil and the outside diameter of the framework firstly, and then to linearly decrease the tension of winding optical fiber layer by layer during winding until the whole coil is completed.

The tension used when winding the first layer is:

$$F_1 < Y - \frac{\varphi_F \cdot E}{D + \varphi_F} \cdot \frac{\pi D^2}{4} \cdot 9.8 \cdot 10^3$$

in which, $\varphi_F$ is the outside diameter of the optical fiber;
Y is the most allowable tension of the optical fiber and normally lower than 30 g;
E is the elastic modulus of the optical fiber;
D is the inner diameter of the framework.

The decreasing coefficient x of the tension of winding optical fiber, which is decreased linearly layer by layer, satisfies that $nx+2<F_1$;

in which, n is the number of layers of the winding coil;
$F_1$ is the tension of winding fiber of the first layer.

The pressure when performing impregnation with curing adhesive under vacuum pressure in the step (2) is controlled in the range of 0.5~2 Mpa.

The hardness of the curing adhesive used when impregnation in the step (2) is lower than 25 degree, and the coefficient of thermal expansion is lower than $5 \times 10^{-4}$.

Add heat conductive material in the curing adhesive to make the optical fiber coil reach heat balance quickly in temperature environment.

The rotate speed of the centrifugal machine is controlled in the range of 500~2000 revolutions/minute, and the time is controlled in the range of 2~5 minutes.

The curing in the step (3) uses some methods such as heating, depositing in normal temperature or irradiating using ultraviolet light.

The heating temperature in the step (4) is not higher than 60° C.

The advantages of this invention compared with the prior art are:

(1) The detachable framework of this invention has simple structure and is easy to detach.

(2) The method of producing optical fiber coil in this invention, which uses the detachable framework of this invention and coats a layer of thermosol on the surface of the framework before winding coil, reduces the difficulty of taking the optical fiber coil off from the framework and decreases the probability when the optical fiber coil is injured accidentally and the probability of introducing other stress during the framework is taken off. This invention which uses the method of performing impregnation with curing adhesive under vacuum pressure, can make both of the inside and outside layers of the optical fiber coil be impregnated with adhesive evenly. This is beneficial to achieve symmetry of temperature field of optical fiber coil and vibration characteristics of optical fiber coil can be improved greatly. The finally obtained non-framework optical fiber coil eliminates the received force of optical fiber coil caused by the thermal expansion and cold contraction of the framework of the optical fiber coil and other distortion, and temperature characteristics of optical fiber coil can be improved greatly.

(3) In this invention, the method of whirling coating with centrifugal machine is used after the completion of impregnating the optical fiber coil, which makes the adhesion of the adhesive in the optical fiber coil more even so that the performance of the optical fiber coil can be improved.

(4) In this invention, through the method of winding coil and the way of decreasing the tension layer by layer, the stress of the whole coil is controlled, which makes the distributed stress of the optical fiber coil smaller and improves the stress matching in the coil in work temperature condition.

(5) In this invention, the method of coating heat insulating adhesive on the most inner and outer layers of optical fiber coil is used, which reduces the influences of temperature field to optical fiber coil and resolves the problem of long stability time of high-precision optical fiber gyro.

(6) In this invention, the method of adding silver powder or other heat conductive materials in curing adhesive is used, which makes optical fiber coil reach heat balance quickly in temperature field and reduces the non-reciprocal error caused by the existence of temperature grads.

In summary, this invention uses the non-framework optical fiber coil to form high-precision optical fiber gyro and adopts a technique that makes adhesive cling on the optical fiber coil evenly in adhesive impregnation, which improves temperature stability and vibration characteristics of high-accuracy optical fiber gyro and accuracy greatly; when designing and detaching framework, a certain detaching technique is used so that the producing efficiency of optical fiber coil is improved and damages or other adverse effects to optical fiber coil are reduced; this invention also improves the stability time of high-precision optical fiber gyro through the method of fastening heat balance of optical fiber coil and isolating the influence of outer temperature field to the coil.

DETAILED DESCRIPTION OF THE PREFERRED EMBODIMENT

Embodiments 1 and 2

Figure 1:
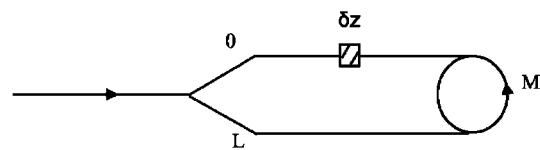
FIG. 1 is a diagrammatic drawing of the temperature or stress disturbance in the optical fiber coil.
Figure 2:
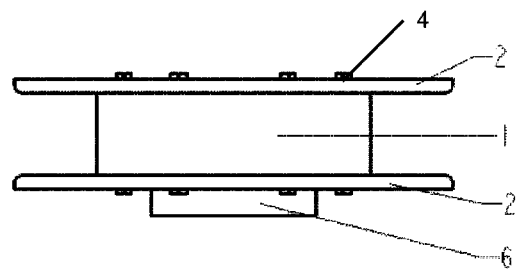
FIG. 2 is a structural diagrammatic drawing of one preferable embodiment of detachable framework used for winding optical fiber coils in this invention, in which 2a is the front view and 2b is the half section upward view.
Figure 2:
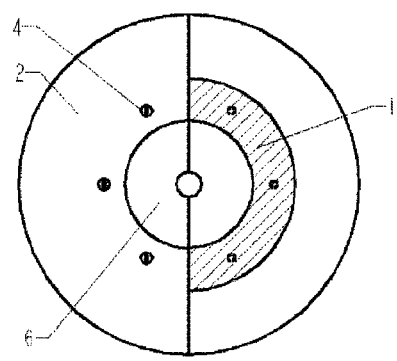
Figure 3:
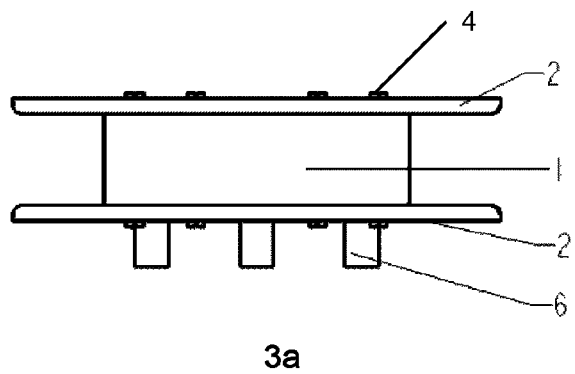
FIG. 3 is another structural diagrammatic drawing of one preferable embodiment of detachable framework used for winding optical fiber coils in this invention, in which 3a is the front view and 3b is the half section upward view.
Figure 3:
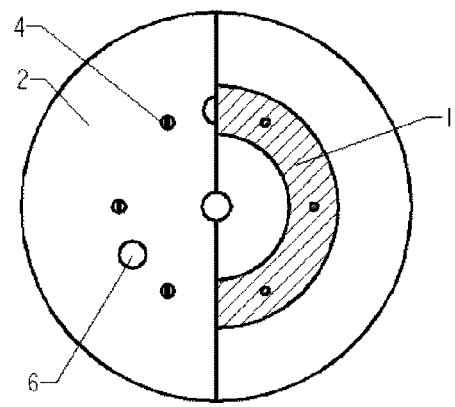

As shown, FIGS. 2 and 3 are the structural diagrammatic drawings of two preferable embodiments of the detachable framework used for winding optical fiber coils in this invention, respectively. They both include a wheel hub 1 and two flanges 2, and the two flanges 2 are installed on both ends of the wheel hub 1 respectively and demountable through the screw 4, and the wheel hub 1 has a demountable structure which separates the wheel hub from the optical fiber coil winded on the wheel hub. This demountable structure can be a convex platform 6 made on one of the ends of the wheel hub 1 and a hole matching with the convex platform 6 that are set on the flanges 2. The production of convex platform 6 can use the manner in the FIG. 2, i.e., setting it in the center of the end face of the wheel hub 1, or the manner in the FIG. 3, i.e., setting it on the edge of the end face of the wheel hub 1. The convex platform 6 matches with the corresponding hole in the flanges 2. After the flanges 2 is detached from wheel hub 1, the portion that is not covered by optical fiber (convex platform 6) is preserved on the wheel hub 1 which is separated from the optical fiber coil by dragging the convex platform 6, i.e., the convex platform 6 helps the wheel hub 1 to be removed from the optical fiber coil. Connection manner of the flanges 2 and the wheel hub 1 can employ mechanical fixing connection or adhesive connection.

Embodiment 3

Figure 4:
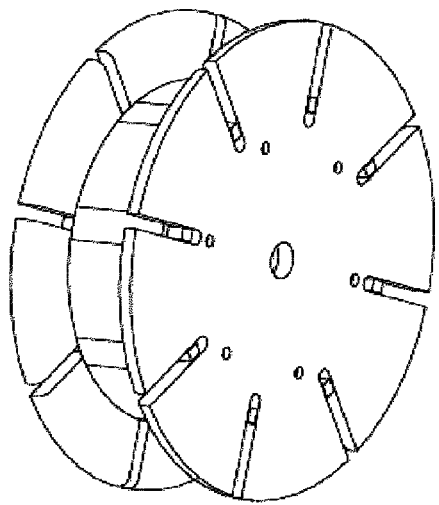
FIG. 4 is a framework stereogram of the third preferable embodiment of the detachable framework used for winding optical fiber coils in this invention.
Figure 5:
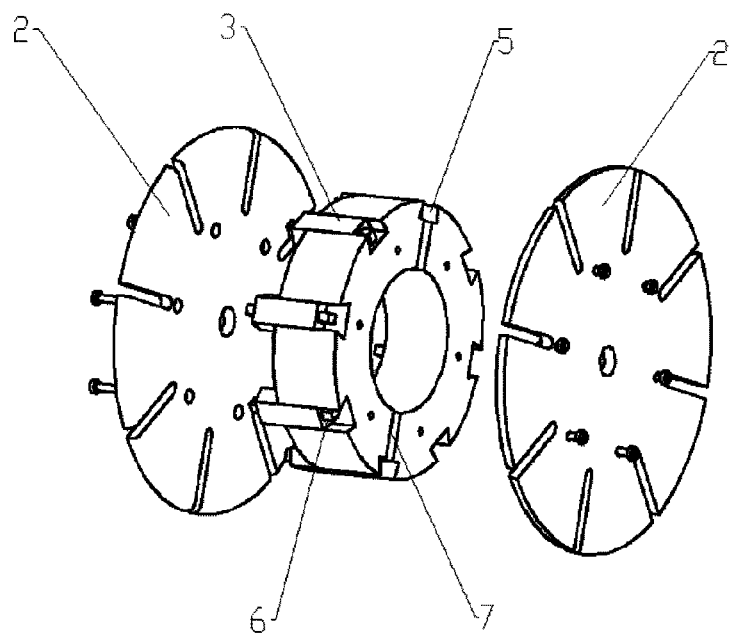
FIG. 5 is an exploded diagrammatic drawing of the FIG. 4.
Figure 6:
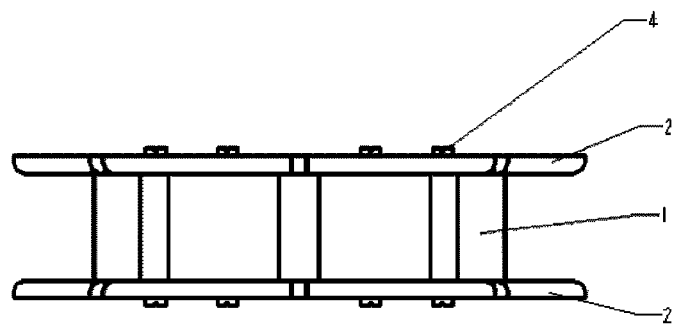
FIG. 6 is a sub-view of the FIG. 4, in which 6a is the front view and 6b is the half section top view.
Figure 6:
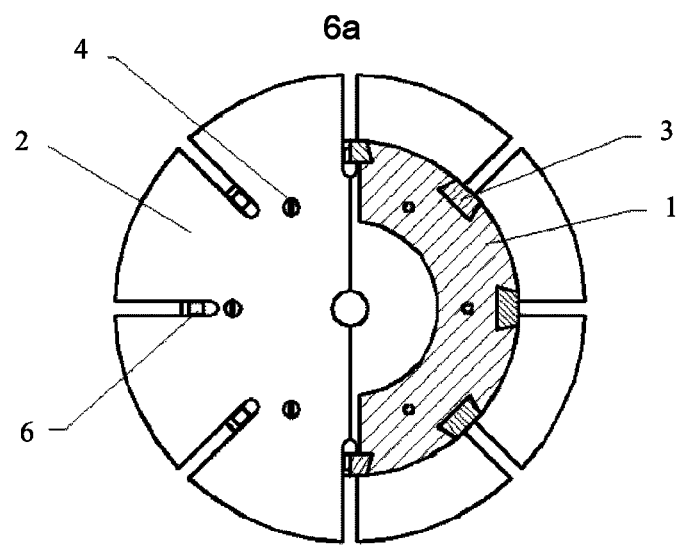

As shown, FIGS. 4, 5 and 6 are the stereogram, exploded diagrammatic drawing and sub-view of the framework of the third preferred embodiment of the detachable framework used for winding optical fiber coil in this invention, respectively. It includes a wheel hub 1, two flanges and a demountable structure. The wheel hub 1 is spliced by at least two columns whose inside and outside cylinders are curved surface. The demountable structure includes a axial through gap formed between at least one of the columns splicing places of the two facing cylinders and a filling component matching with the gap and a convex platform made on one of the ends of the wheel hub or an end of the filling component. Holes or grooves matching with the convex platform are set on the flanges. In this invention, two columns with both the inner and outer cylinders being curved surface are used, i.e., the wheel hub 1 is composed of two symmetric semi-columns. The wedged groove 5 set near the outer ring of the semi-column and inside-demounting gap 7 set near the inner ring of the semi-column are made at the conjunction place of the two semi-columns, which constitute the axial through gap as described above. These two parts communicate in the radial direction, but the perimeter of the wedged groove 5 is larger than that of the inside-demounting gap 7. Additionally, there are more wedged grooves 3 set along the outer ring of the semi-columns, the convex platform 6 is set on the ends of the wedged block 3 matching with the wedged groove 5, and the two flanges 2 with grooves matching with the convex platform 6 on it are installed on the two ends of the wheel hub 1 respectively. In this way the framework is formed. The connection manner of the flanges 2 and the wheel hub 1 in the framework can be mechanical fixing connection (with screw 4) or adhesive connection. One should assemble the detachable framework as the FIG. 4 shown before winding rings firstly, and take off the flanges 2 and wedged block 3 in the axial direction in order after winding the optical fiber and curing. The outer circle of the wedged block 3 and the outer cylinder of the wheel hub 1 are produced by combinational producing method, which guarantees the higher cylindricity. Furthermore, the wedged block 3 is designed as swallow-tailed, which prevents the wedged block 3 moving in the radial direction, and the grooves in the flanges restrict the axial place of the wedged block 3. The demountable structure of the wheel hub 1 is designed as a gap with axial through, which makes that the wheel hub 1 is composed of multiple columns and each column is fixed on the flanges. When the flanges are taken off, it is easy for each column to approach the gap so that the wheel hub 1 is easy to be taken off. In this embodiment, the wheel hub 1 is composed of two semi-columns, the gap is composed of the inside-demounting gap 7 and the wedged groove 5 is preserved between the two semi-columns. The wedged block 3 on the wedged groove 5 can support the outside of the inside-demounting gap 7 so that the influence of existence of gap on winding optical fiber can be eliminated. After curing of optical fiber coil, the wedged block 3 above the inside-demounting gap 7 can be taken out. So the two semi-columns which compose wheel hub 1 contract inwards naturally and the detachment of optical fiber coil and framework can be implemented more easily. The wedged groove 5 also can be set on other places on the wheel hub 1, which have no inside-demounting gap and are near to outer circle.

The design of detachable framework in embodiments 1-3 can be performed referring to the following processes:

Firstly, according to the basic principle of Sagnac interferometer: formula $$\Delta \varphi_R = \frac{2\pi LD}{\lambda C} \Omega \qquad (1)$$

In which, $\Delta\phi_R$ is the phase difference between two beams of light which propagates in opposite directions in optical fiber coil, L is the length of the optical fiber coil, D is the average diameter of the optical fiber coil, λ is the wave length of light wave, C is the propagation speed of light wave in vacuum, Ω is the angle speed to which the optical fiber gyro is sensible. That is to say, the phase difference between two beams of light which propagates in opposite directions in optical fiber coil, $\Delta\phi_R$, is proportional to the product of the length L of the optical fiber coil and the average diameter D. It is comprehensive to determine the value of product LD of the length L and the average diameter D of the optical fiber coil according to the detailed accuracy requirement of optical fiber gyro, and then perform simulation and determine parameters L, D, B, $D_1$ according to the required value of coil window ratio n, in which B is the width of the framework, $D_1$ is the diameter of the framework, and η=B/(D−$D_1$).

In the following, combining the above three kinds of structure, the producing method of optical fiber coils in this invention is introduced in details as follows:

A layer of thermosol is coated with the thickness of about 1 mm on the surface of framework described in the embodiments 1, 2 or 3, and then the optical fiber is winded on the framework according to the quadrupole symmetry method after adhesive curing. Then 2m-long optical fibers are preserved on both ends of the coil respectively and made to be a circle of about φ30 mm to protect the 2m-long optical fibers well. Meanwhile, the fiber root parts are fixed on the framework so as to prevent the 2m optical fibers outside the optical fiber coil from impregnating adhesive. It is subsequent to put the winded optical fiber coil into vacuum pressure device to vacuumize, and then inject curing adhesive that is mixed with silver powder or other heat conductive materials into the vacuum pressure device, in which the hardness of the curing adhesive is lower than 25 degree and the coefficient of thermal expansion is lower than $5\times10^{-4}$. After that, air or other gases are injected into the vacuum pressure device to increase pressure controlled in the range of 0.5~2 Mpa. After 30 minutes, it is the turn to take out the optical fiber coil then fixed on the certain craft equipment to install it on the centrifugal machine with the rotate speed set as 500~2000 r/min. Starting the centrifugal machine to whirl coating for 2~5 minutes, the optical fiber coil can be taken off to perform curing according to the curing request of the used adhesive. After curing, the stress of the optical fiber coil should be released with the vibration of 2~6 g magnitude and time controlled in the range of 30~60 minutes. Then the optical fiber is put into a temperature box with the temperature range of 40~60° C. After the temperature box reaches the set temperature for 2 minutes, one can take off the optical fiber coil from the framework, clean the surface of the optical fiber coil, and then coat the heat insulation adhesive evenly on the most inner and the most outer layers. After curing of the heat insulation adhesive, the production of the entire non-framework optical fiber coil is completed.

Coil winding described as above can use the traditional quadrupole symmetry method or the following method:

First, the tension of winding optical fiber of the first layer is set. Assuming that the outside diameter of optical fiber is $\phi_F$, the number of layers of winding coil is n, the most allowable tension of the optical fiber is Y, and then the tension of winding fiber of the first layer is controlled lower than $$Y = \frac{\varphi_F \cdot E}{D + \varphi_F} \cdot \frac{\pi D^2}{4} \cdot 9.8 \cdot 10^3.$$

As the received stress of the optical fiber is the sum of the tension of optical fiber winding and bending stress, in the case that the size of framework has been determined, the tension of winding optical fiber becomes a factor that directly determines the stress of optical fiber. Assuming that the tension decreasing coefficient of each layer's optical fiber is x, then x satisfies: nx+2<$F_1$. This principle is used to control the optical fiber winding tension of the most upper layer to be no lower than 2 g. If the tension is lower than 2 g, the optical fiber cannot be winded tidily and the cross coupling among optical fibers can also bring extra stress to the optical fiber coil. If the value of x is lower than 1 g, the decreasing unit can be changed from one layer to a quadrupole, and so forth. Normally, the value of Y is lower than 30 g.

Optical fiber gyro craft equipment is used to test optical fiber coils and table 1 shows the temperature testing data of optical fiber coils with different techniques when used to optical fiber gyro. It can be seen from the table 1 that the absolute value of null position mean value and standard deviation benefitting from the technique in this invention is much smaller than the corresponding parameter values using normal technique. Table 2 is the vibration testing data of optical fiber gyros installed on the vibration table to vibrate in random. If the changes of the null position mean value and standard deviation between in vibration and before and after vibration are smaller, the technique will be better. For example, it can be seen from the table 2, using the techniques of this invention, the changes between standard deviation in vibration 1.23, standard deviation before vibration 0.24 and standard deviation after vibration 0.25 are 0.99 and 0.98, respectively. While using normal techniques, the changes between standard deviation in vibration 2.25, standard deviation before vibration 0.42 and standard deviation after vibration 0.46 are 1.83 and 1.79, respectively. So the variety of standard deviation using techniques of this invention is much smaller than that using normal techniques. Therefore, it can be seen from the table that the performance of the optical fiber coil that uses the techniques in this invention is much better than that of those using normal techniques.

TABLE 1

Temperature testing data of the optical fiber gyros with
optical fiber coils employing different techniques

| Application of optical fiber coil with different techniques in gyro | Normal technique | Technique in this invention |
|---|---|---|
| Null position mean value (°/h) | −1.76 | −0.83 |
| Standard deviation (°/h) | 0.44 | 0.21 |

TABLE 2

Vibration testing data of the optical fiber gyros

| Application of optical fiber coil with different techniques in gyro | Normal technique | Technique in this invention |
|---|---|---|
| Null position mean value before vibration (°/h) | −1.66 | −0.85 |
| Null position mean value in vibration (°/h) | −0.98 | −0.64 |
| Null position mean value after vibration (°/h) | −1.60 | −0.81 |
| Standard deviation before vibration (°/h) | 0.42 | 0.24 |
| Standard deviation in vibration (°/h) | 2.25 | 1.23 |
| Standard deviation after vibration (°/h) | 0.46 | 0.25 |

The part that is not described in details in this invention is well known to technical personnel in this field.

The invention claimed is:

1. A method of producing optical fiber coil achieved using a detachable framework for winding optical fiber coil that comprises a wheel hub, which has a demountable structure to separate the wheel hub from the optical fiber coil winded on the wheel hub, and two flanges, which are installed on both ends of the wheel hub respectively and demountably, and the method comprising the following steps:
    (1) coating a layer of thermosol on the surface of the framework;
    (2) winding the coil around the detachable framework, placing the winded optical fiber coil in a vacuum pressure device, and performing impregnation with a curing adhesive under vacuum pressure;
    (3) performing optical fiber coil curing; and
    (4) heating the cured optical fiber coil and taking off the framework.

2. A method of producing optical fiber coil according to claim 1, further comprising after the step (2):
    (2)′ placing the optical fiber coil which was already impregnated on a centrifugal machine to whirl coating.

3. A method of producing optical fiber coil according to claim 2, wherein the rotate speed of the centrifugal machine is controlled in the range of 500~2000 revolutions/minute, and the time is controlled in the range of 2~5 minutes.

4. A method of producing optical fiber coil according to claim 1, further comprising after the step (4):
    (4)′ coating heat insulating adhesive both on the most inner layer and the most outer layer of the optical fiber coil.

5. A method of producing optical fiber coil according to claim 1, wherein after curing in the step (3), the stress releasing of the optical fiber coil is performed using small magnitude of vibration.

6. A method of producing optical fiber coil according to claim 5, wherein the magnitude of vibration is controlled in the range of 2~6 g and the time is controlled in the range of 30~60 minutes.

7. A method of producing optical fiber coil according to one of claims 1 to 6, wherein the thickness of the thermosol in the step (1) is 0.5~1 mm.

8. A method of producing optical fiber coil according to one of claims 1 to 6, wherein the pressure when performing impregnation with curing adhesive under vacuum pressure in the step (2) is controlled in the range of 0.5~2 Mpa.

9. A method of producing optical fiber coil according to one of claims 1 to 6, wherein the hardness of the curing adhesive used when impregnation in the step (2) is lower than 25 degree, and the coefficient of thermal expansion is lower than $5 \times 10^{-4}$.

10. A method of producing optical fiber coil according to claim 1, wherein the process of winding the coil in said step (2) is to determine the tension used when winding the first layer according to the number of layers of the optical fiber coil and the outside diameter of the framework firstly, and then to linearly decrease the tension of winding optical fiber layer by layer during winding until the whole coil is completed.

11. A method of producing optical fiber coil according to claim 10, wherein the tension used when winding the first layer is:

$$F_1 < Y - \frac{\varphi_F \cdot E}{D + \varphi_F} \cdot \frac{\pi D^2}{4} \cdot 9.8 \cdot 10^3$$

in which, $\varphi_F$ is the outside diameter of the optical fiber;
    $F_1$ is the tension of winding fiber of the first layer;
    Y is the most allowable tension of the optical fiber and normally lower than 30 g;
    E is the elastic modulus of the optical fiber; and
    D is the inner diameter of the framework.

12. A method of producing optical fiber coil according to claim 10, wherein the decreasing coefficient x of the tension of winding optical fiber, which is decreased linearly layer by layer, satisfies that $nx+2<F_1$;
    in which, n is the number of layers of the winding coil; and
    $F_1$ is the tension of winding fiber of the first layer.

* * * * *